United States Patent
Carpentier et al.

(10) Patent No.: US 6,498,629 B1
(45) Date of Patent: Dec. 24, 2002

(54) CONDITIONING SYNCHRONIZATION SIGNALS BASED ON LINE-BY-LINE DISPLAY OF VIDEO SIGNALS

(75) Inventors: Dirk Carpentier, Unterkirnach (DE); Günter Gleim, Villingen-Schwenningen (DE); Friedrich Heizmann, Villingen-Schwenningen (DE); Bernd Rekla, Villingen-Schwenningen (DE)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/229,801

(22) Filed: Jan. 13, 1999

(30) Foreign Application Priority Data

Jan. 19, 1998 (DE) .......................... 198 01 732

(51) Int. Cl.⁷ .............................. H04N 9/28; H04N 5/04
(52) U.S. Cl. ......................................... 348/807; 348/511
(58) Field of Search ................................. 348/497, 511, 348/536, 550, 547, 194, 607, 615, 806, 807

(56) References Cited

U.S. PATENT DOCUMENTS 5,138,451 A  * 8/1992 Shinkawa et al. ........... 358/148
5,859,634 A  * 1/1999 Ou et al. .................... 345/213
6,256,003 B1 * 7/2001 Tsuchiya et al. ............ 345/87

FOREIGN PATENT DOCUMENTS

| DE | 3025356 | 4/1980 | ........... G01R/25/00 |
| DE | 3119668 | 5/1981 | ............ H04N/5/04 |
| DE | 258885 | 3/1987 | ............ H04N/5/06 |
| DE | 4244419 | 12/1992 | ............ H04N/5/04 |
| JP | 403123188 | * 5/1991 | ............ H04N/9/28 |

OTHER PUBLICATIONS

Patent Abstracts of Japan: 8–331590; 59–57590; 62–159996; 8–214323; 55–161477; 7–131829; 3–284093.

* cited by examiner

Primary Examiner—Victor R. Kostak
(74) Attorney, Agent, or Firm—Joseph S. Tripoli; Harvey D. Fried; Francis A. Davenport

(57) ABSTRACT

A Circuit for conditioning sync signals for devices for the line-by-line Display of video signals includes, a first input for horizontal sync signals (H1sync, H2sync), a second input for vertical sync signals (Vsync), and a delay stage. The delay stage outputs a signal (Vshift) which is delayed relative to the vertical sync signal (Vsync) by a specific delay time (reg). The circuit determines the timing of the horizontal sync signals (H1sync, H2sync) relative to the vertical sync signal (Vsync) and/or relative to the delayed signal (Vshift). The delay stage is designed in such a way that the delay time (reg) is adjustable.

9 Claims, 4 Drawing Sheets

CONDITIONING SYNCHRONIZATION SIGNALS BASED ON LINE-BY-LINE DISPLAY OF VIDEO SIGNALS

FIELD OF THE INVENTION

The invention relates to a circuit for conditioning sync signals for colour television sets. In particular, the invention is based on a circuit for conditioning sync signals in accordance with the preamble of Claim 1.

BACKGROUND OF THE INVENTION

A particular area of application for the invention is a convergence correction circuit in a television projection device in which the pictures from three monochromatic picture tubes are projected onto a picture surface. A facility of this type serves, in principle, for the correction of parameters in the raster deflection, for example the correction of north/south and east/west distortions, of pincushion distortions, of non-linearities in the deflection and other geometrical errors in the horizontal and vertical directions. For this purpose, the convergence circuit influences the deflection parameters of each of the three picture tubes depending on the position of the luminous spot. This requires that the convergence circuit, which is frequently designed as an integrated circuit, be synchronized with the beam deflection of the individual picture tubes. The synchronization is effected by means of the pulse-like horizontal and vertical synchronization—or sync for short—signals which are fed to the convergence circuit. In this case, the problem arises that the phase angle of the vertical and/or horizontal sync pulses is not unambiguously defined and may vary from device to device. Noise, humming or crosstalk of the line deflection can give rise to different results in the course of the line counting because the first line pulse of the second field occurs contemporaneously with the vertical sync pulse, and the line pulse is therefore not always unambiguously identified. This leads to the position of inserted signals in a field varying by one line ("line jitter").

In order to overcome this problem, it is already known in the prior art to synchronize the convergence circuit not with the vertical sync signal but with a pulse which is temporally offset by a specific quantity. This delayed pulse is temporally offset by a constant value relative to the first line pulses of the two fields, with the result that none of the horizontal line pulses then occurs simultaneously with the delayed pulse and, consequently, the influence of crosstalk or humming does not, in principle, present difficulties any longer. In this way, it is ensured that the respective pulses are always unambiguously identified. The best interference margin is given when the delayed vertical pulse lies exactly between the two first line pulses of the two fields. However, if the phase angle differs between different devices, then the optimum interference margin is no longer ensured in every device.

SUMMARY OF THE INVENTION

Taking this as a departure point, an object of the invention is to provide a circuit for conditioning sync signals which affords improved synchronization with the vertical and/or horizontal deflection of a picture tube.

This object is achieved by means of a circuit for conditioning sync signals according to Claim 1.

A fundamental concept of the invention is to provide measuring means in order to determine the timing of the horizontal sync signals relative to the vertical sync signal and/or relative to the signal delayed by the delay stage, and to design the delay stage of the circuit arrangement in such a way that the delay time is adjustable.

In accordance with a particularly advantageous development of the invention, the circuit can have computing means which enable the measurement results obtained in this way to be utilized in order to calculate a specific delay time using predetermined rules. The aim of this calculation is to avoid, for example, interference in the course of the line counting and disadvantageous effects associated therewith.

Subclaims relate to further advantageous refinements of the invention.

A further object of the invention is to specify a method by means of which improved synchronization of a circuit with the deflection of a picture tube is achieved.

This object is achieved by means of a method according to Claim 5.

The method according to the invention has the advantage that a signal delayed by a fixed period of time, with the disadvantages mentioned in the introduction, is not used. Rather, the time delay for the time-delayed signal can be continually adapted to the phase angle of the vertical and horizontal sync pulses in accordance with predetermined rules.

It is particularly advantageous if the time interval between the delayed signal and the directly leading and/or lagging horizontal sync signal is essentially identical. In this way, the optimum interference margin between the time-delayed vertical pulse and the relevant line pulses is always achieved.

However, the time delay can also be calculated in such a way that the time interval between the delayed signal and the directly leading and/or lagging horizontal sync signal is greater than temporal shifts which are caused by interference and can be estimated for example on the basis of values from experience.

Subclaims relate to the development of the method according to the invention for the purpose of displaying video frames in two fields.

Finally, an object of the invention is to provide a television set in which the synchronization of electronic circuits with the deflection is improved.

This object is achieved by means of a television set according to Claim 10.

BRIEF DESCRIPTION OF THE DRAWINGS

An exemplary embodiment of the invention is illustrated in the drawing, in which.

DETAILED DESCRIPTION OF THE PREFERED EMBODIMENTS

Figure 1:
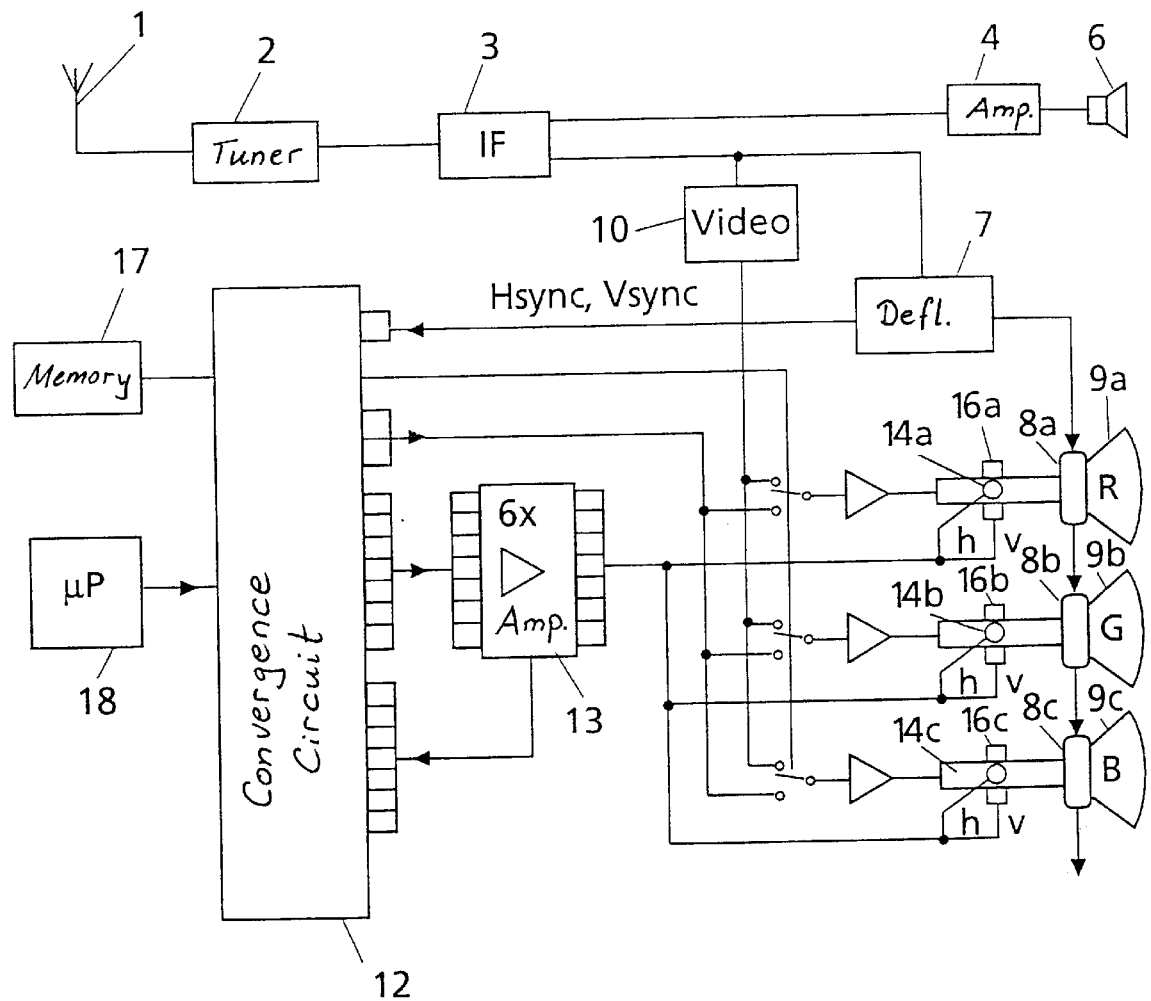
FIG. 1 shows a schematic illustration of a television projection device.

FIG. 1 schematically illustrates the structure of a television projection device. The television signals received by an antenna 1 or via a cable connection are amplified in a tuner 2, brought to an intermediate frequency by means of a mixing stage (not shown) and then amplified in an intermediate frequency stage 3. In subsequent demodulation stages, the signals at the intermediate frequency are separated into audio signal and CVBS television signal. The audio signal is demodulated in an audio stage 4, amplified and output via a loudspeaker 6. In a separation stage (not illustrated), the horizontal and vertical sync signals Vsync and Hsync contained in the CVBS signal are separated and fed to a deflection unit 7. The deflection unit 7 controls the horizontal and vertical deflection coils 8a . . . c of the monochromatic picture tubes 9a . . . c of the projection device. The video signal is processed further in a video processing circuit 10 and fed to the individual picture tubes 9a . . . c. A convergence circuit 12 with an assigned amplifier stage 13, which is connected to horizontal and vertical convergence coils 14a . . . c; 16a . . . c of the individual picture tubes 9a . . . c, ensures, in a manner known per se, good convergence setting of the projection device. The convergence values are stored in a memory 17.

The form in which the television signal is present, for example also separated into luminance and chrominance signals, is fundamentally unimportant for the invention.

The convergence circuit 12 must be synchronized with the deflection unit 7 in order to establish unambiguous assignment between inserted signals or convergence correction values and the lines written on the screen. In the present case lines are counted in the convergence circuit 12 in order to be able to localize insertions at a specific location on the screen. For this purpose, the vertical and horizontal sync signals Vsync and Hsync are output by the deflection unit 7 to an input of the convergence circuit 12. In order to control the programme executions, in particular the display of the normal television picture and also the convergence correction, the convergence circuit 12 is connected to a microprocessor 18.

Figure 2:
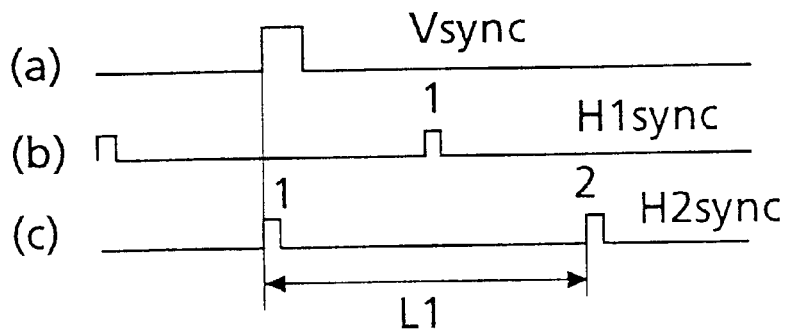
FIG. 2 shows the pulse train of vertical and horizontal pulses.

FIG. 2 illustrates a timing diagram of the input pulses of the convergence circuit 12 (FIG. 1) as occur in the case of a television picture which is displayed in two fields. FIG. 2a shows the vertical sync pulse Vsync, FIG. 2b shows the line pulses H1sync of the first field and FIG. 2c shows the line pulses H2sync of the second field. In the following text, the abbreviation Hsync is used generally for line pulses, while H1sync and H2sync designate only the line pulses of the first field and second field, respectively. The counting procedure is defined as follows for the description below: the counting of the line pulses begins with the leading edge of the vertical pulse, that is to say that line pulse whose leading edge occurs simultaneously with or after the leading edge of the vertical pulse is the first line pulse of the relevant field. The number of the respective line pulse is specified above the relevant line pulse in FIG. 2 and the subsequent timing diagrams. The first line L1 of a field lies between the first and second line pulses. This counting procedure continues correspondingly in each field.

If the synchronization of the convergence circuit 12 (FIG. 1) is obtained from the deflection signals or if the sync signals are not standard-conforming (for example in the case of video games, etc.), the phase angle of the vertical and horizontal signals Vsync; H1sync, H2sync is not unambiguously defined. It may vary from device to device. Noise, humming or crosstalk, primarily of the line pulses into the vertical sync signals, can lead to different results in the course of the line counting mentioned in the introduction, because, in the second field, the first line pulse occurs contemporaneously with the vertical sync signal Vsync and, therefore, is not always identified. Due to fluctuating results in the course of the line counting, the position of inserted signals in a field will vary by one line. So-called "line jitter" occurs.

In a first approach, this problem can be solved by delaying the vertical sync pulse by a fixed value reg, as is illustrated in FIGS. 3a and 3b. The delay time reg is chosen such that, in a temporal respect, the interval between the delayed vertical pulse Vshift and the first line pulse of the first field and the first line pulse of the second field is the same. The signal Vshift maintains the interference margin X and Z relative to the respective line signal H1sync and H2sync in the two fields (FIG. 3c, FIG. 3d). The value for the time delay reg which is optimal in respect of the interference margin is consequently given when the quantity of X is equal to the quantity of Z. The period of time Y is additionally illustrated in FIG. 3d and specifies how much time elapses between the occurrence of the delayed signal Vshift and the first line pulse of the second field occurring after the delayed signal Vshift. The significance of the period of time Y corresponds to that of the period of time X in the first field. The way in which the variables X and Y are obtained will be explained below. clli designates the duration of a television line, which is known and is constant for all devices. It may be noted that the interference margin between the line pulses of the second field and the delayed signal is determined by the period of time Z, where the following holds true:

$$Y+Z=clli \quad (I)$$

Figure 3:
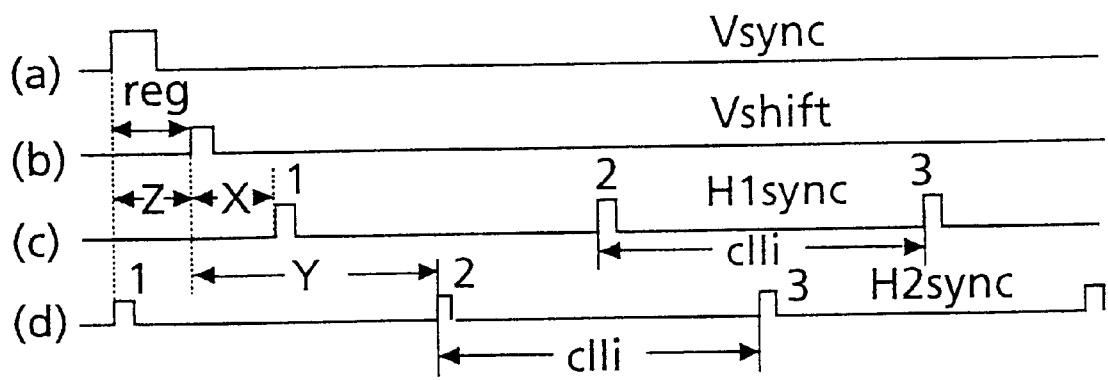
FIG. 3 shows the pulse train of vertical and horizontal pulses, and also of a pulse which is delayed relative to the vertical pulse.
Figure 4:
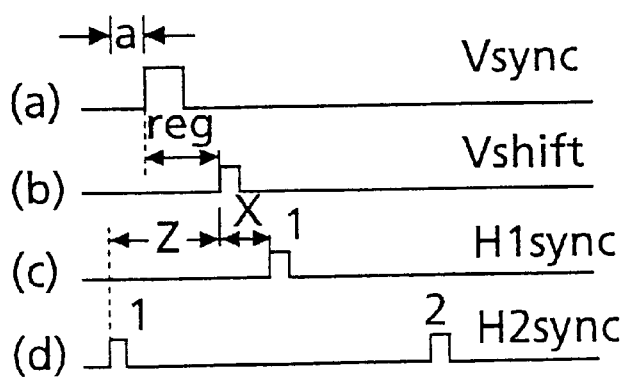
FIG. 4 shows a timing diagram corresponding to FIG. 3, the phase angle of the vertical pulse being offset relative to the horizontal pulses by a specific quantity.

FIG. 4 illustrates a timing diagram which is produced when the vertical sync signal Vsync is delayed by a period of time a relative to the situation illustrated in FIG. 3 (FIG. 4a). The immediate consequence of this is that the delayed signal Vshift is likewise delayed by the period of time a and is approximated to the first line pulse of the first field (FIG. 4c). As is evident from FIG. 4c in conjunction with FIG. 4d, the interference margins between the line pulses of the first and second fields X, Z are then different. This ultimately means that the interference margin between the delayed signal Vshift and the first line pulse in the first field is reduced.

The same applies correspondingly when the vertical pulse Vsync occurs earlier relative to the situation illustrated in FIG. 3. For the sake of comprehensibility, however, only the case of the delayed Vsync pulse is discussed in the following text.

Figure 5:
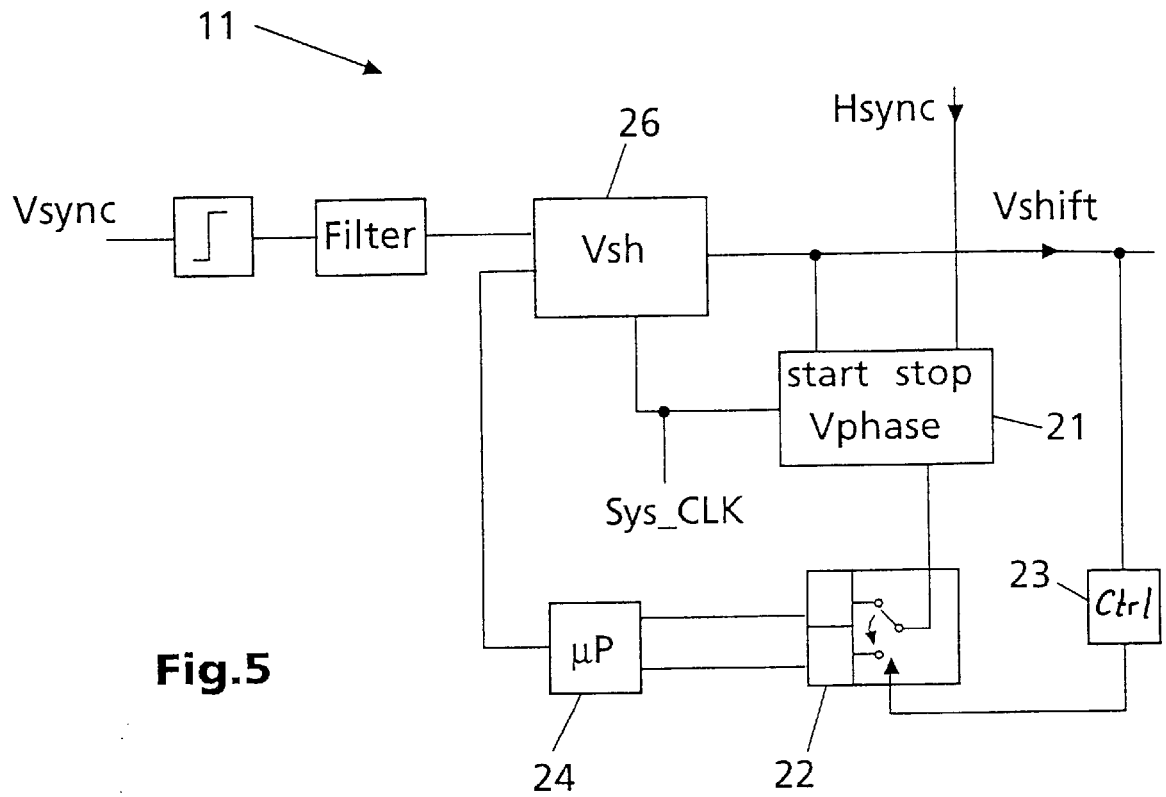
FIG. 5 shows a schematic circuit diagram.

FIG. 5 schematically illustrates a circuit according to the invention, which circuit is designated as a whole by 11 and is arranged within the convergence circuit 12 (FIG. 1). By means of the circuit 11, the abovementioned difficulty which ensues from a constant delay time reg is resolved by the fact that the interval between the delayed signal Vshift and the horizontal sync signals is measured in the two fields and the delay time reg is optimized using these values.

For this purpose, the circuit 11 has a counter 21 for measuring the times X and Y. The counter 21 is initially started by the delayed vertical signal Vshift. The counter 21 is stopped by the next line pulse. The results of this time measurement are stored, separately for the two fields, in a memory 22. For this purpose, a control unit 23 is provided which outputs a control signal to the memory 22, which control signal serves for addressing different areas in the memory 22. The control signal indicates whether or not the field has changed. In this way, the measured times X and Y and/or Y and X can be selectively read out by a computing unit 24. The computing unit 24 calculates from the values a time delay reg in such a way that the interference margins X and Z are identical. The time delay reg forms an input signal for a delay element 26, which sets the delay of the signal Vshift in accordance with the value of reg. The function of the computing unit 24 can also be performed by the microprocessor 18 or an external computer.

For the sake of completeness, mention is made of the fact that it is also possible, in principle, to refer to the vertical sync signal in the course of calculating the time delay reg, because an unambiguous temporal assignment exists between the vertical sync signal Vsync and the delayed signal Vshift.

Figure 6:
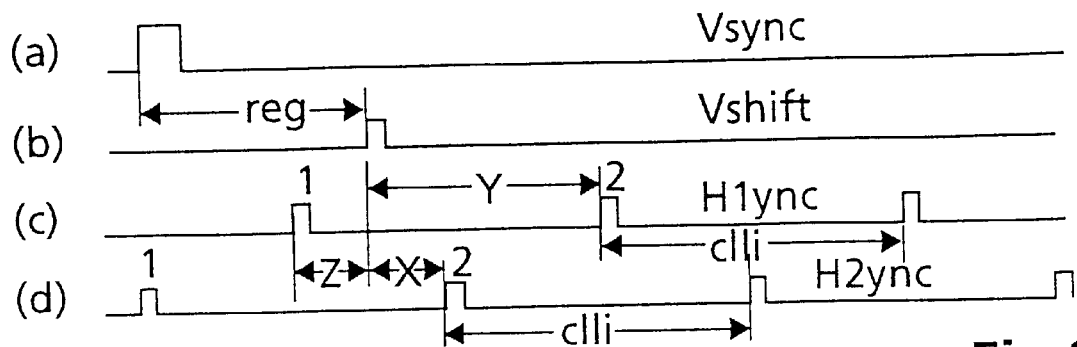
FIG. 6 shows a timing diagram corresponding to FIG. 3 in which the delayed signal lies in the second line of the first field.
Figure 7:
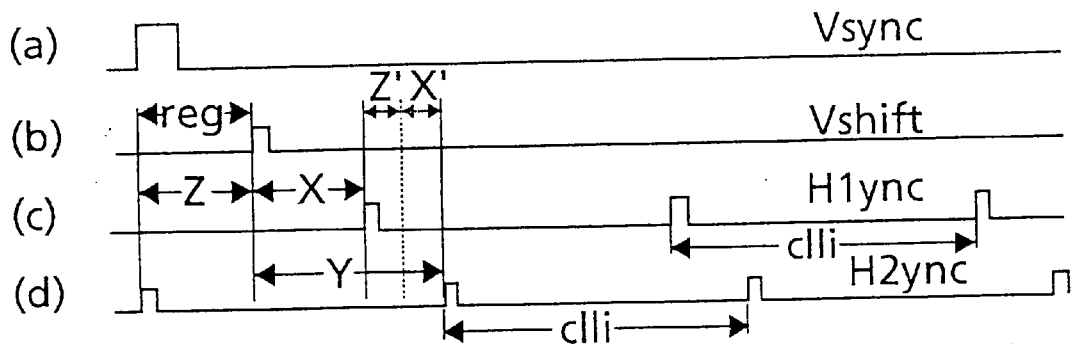
FIGS. 7, 8 show timing diagrams in which the line interlacing, which is known per se, is not symmetrical.
Figure 8:
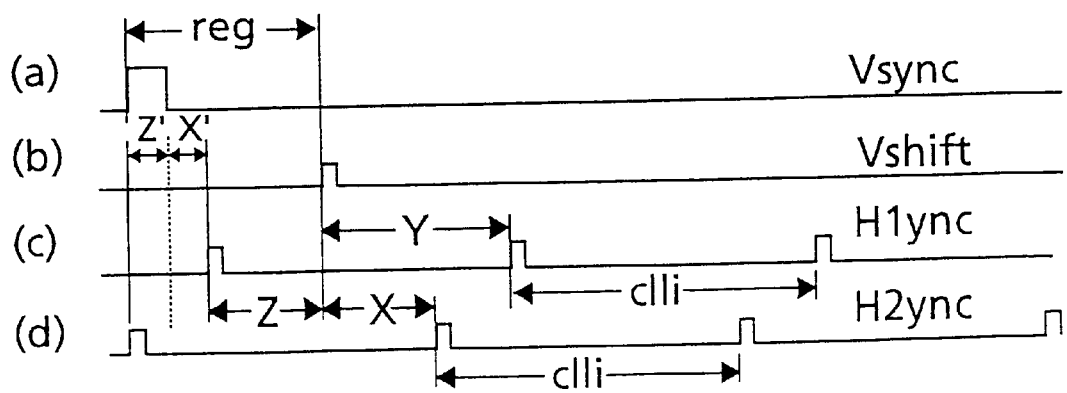

However, this type of calculation does not lead to optimal interference margins in every case, as becomes clear from a consideration of FIGS. 6 to 8.

In the example shown in FIG. 6, the phase angle of the Vshift signal and of the line pulses differs from that shown in FIG. 3. In this case, the signal Vshift lies between the first line pulse in the first field and the second line pulse in the second field. The interference margins X, Z between the delayed signal Vshift and the line pulses of the two fields are, however, equal to those in the example illustrated in FIG. 3. Owing to the symmetrical line interlacing in the example illustrated, there is a therefore second equivalent position for the signal Vshift, which is optimized in the sense of identical interference margins X and Z. However, this no longer applies if the line interlacing is no longer symmetrical. Such situations occur in practice when the phase angle of the vertical and horizontal sync signals varies between individual devices of a series of devices and also between devices from different series. In particular, this phase angle varies when the signal source is not a television transmitter but rather, for example, a computer or a games console.

FIG. 7 also shows a timing diagram with asymmetrical line interlacing. A situation in which the delayed signal Vshift occurs within the first line of the first field is illustrated by solid lines in FIG. 7b. The delay reg is calculated in the manner described above such that the variables X and Z are identical. If the signal Vshift did not occur until in the second line of the first field, the corresponding variables X' and Z' would be obtained instead of the variables X and Z, where X' is likewise identical to Z'. The latter situation is illustrated by broken lines in FIG. 7b. Consequently, the condition which is mentioned in the introduction and on which the calculation of the delay time reg is based, namely $$X=Z \tag{II}$$

and $$X'=Z' \tag{II'},$$

is fulfilled in both cases. Obviously, however, it is more favourable in the case of the pulse train illustrated if the signal Vshift occurs in the first line of the first field, because the interference margins X and Z are significantly greater than the interference margins X' and Z', respectively.

The situation is quite the opposite in the case of the timing diagram shown in FIG. 8. In this case, the greater interference margins are achieved when the signal Vshift occurs in the second line of the first field.

In order always to achieve the greatest possible interference margin, the computing unit 24 therefore calculates the interference margins at least once for both possibilities, that is to say if the signal Vshift lies in the first or second line of the first field. That delay time for which the greater interference margins are obtained is then selected.

As an alternative to this, it is also possible for the computing unit 24 to calculate the interference margins only for one of the two possibilities and then additionally to check whether $$X \text{ and/or } Z >= clli/2 \tag{III}.$$

If this relationship is fulfilled, then the greatest possible interference margins are achieved. The same also applies, of course, to the variables bearing a prime, that is to say $$X' \text{ and/or } Z' >= clli/2 \tag{III'}.$$

What is common to both alternatives is the fact that when the interference margins are identical (that is to say X=X' and/or Z=Z'), for example, the shorter delay time is given preference.

Mathematically, it is possible to express the above-described secondary conditions in the course of calculating the time delay reg by the formulae (II) to (IV) or (II') to (IV'), where:

$$\text{If } X>X', \text{ then choose } X \tag{IV}.$$

Figure 9:
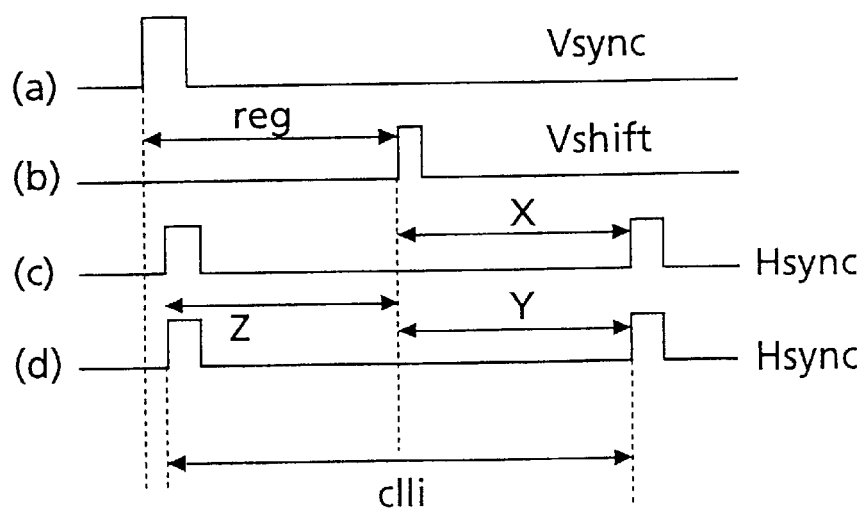
FIG. 9 shows a timing diagram which is produced by the method of progressive scanning.

Finally, FIG. 9 illustrates a timing diagram of the kind that occurs in a television set with progressive picture scanning. The calculation of the optimal delay time reg is considerably simplified by the fact that there are no fields rather only a frame. As in the case of the exemplary embodiment described above, the period of time X between the delayed signal Vshift and the first line pulse occurring thereafter is measured in the manner already described. Irrespective of a temporal shift between the vertical pulse Vsync (FIG. 9a) and the line pulses, the optimum interference margin is always achieved when the time-delayed pulse Vshift lies exactly between two line pulses (FIGS. 9b, 9c). The delay time reg is thus set such that the following holds true:

$$X=clli/2 \tag{V}.$$

Since X=Y is always fulfilled in the case of progressive picture scanning (FIGS. 9c, 9d), at the same time the following is also fulfilled $$X=Z \tag{II}$$

What is claimed is:

1. Method for the synchronization of a circuit arrangement with a television signal, the method comprising the following steps:
   a) deriving a vertical sync signal (Vsync) from a vertical deflection stage of a television set and feeding the vertical sync signal to the circuit arrangement to be synchronized,
   b) deriving a horizontal sync signal (Hsync) from a horizontal deflection stage of a television set and feeding the horizontal sync signal to the circuit arrangement to be synchronized,
   c) generating from the vertical sync signal (Vsync) a signal, and delaying the signal by a delay time (reg),
   d) measuring in the course of the line-by-line display of the video frame in two fields, the time interval (X, Z) between the delayed signal (Vshift) and the directly lagging horizontal sync signal (H1sync, H2sync) in each field, e) calclating the delay time using predetermined rules in response to the measurement results in step d) in such a way that the time interval (X, Z) between the delayed signal (Vshift) and the directly leading horizontal sync signal (Hsync) of a first field and the directly lagging horizontal sync signal (Hsync) of a second field are essentially identical.

2. Method according to claim 1, characterized in that the delay time is calculated in such a way that the time interval (X, Z) between the delayed signal (Vshift) and the directly leading and/or lagging horizontal sync signal of the first and/or second field (Hsync) is greater than temporal shifts in the sync signals (Vsync, Hsync) caused by interference.

3. Method according to claim 1, characterized in that the delay time is furthermore calculated in such a way that the time interval with respect to the directly leading and/or lagging horizontal sync signal (H1sync, H2sync) of the first and/or second field is maximal.

4. Circuit for conditioning sync signals for devices for the line-by-line display of video signals, —having a first input for horizontal sync signals (H1sync, H2sync), having a second input for vertical sync signals (Vsync), and having a delay stage, which outputs a signal (Vshift) which is delayed relative to the vertical sync signal (Vsync) by a specific delay time (reg), having measuring means (21) for determining the timing of the horizontal sync signals (H1sync, H2sync) relative to the vertical sync signal (Vsync) and/or relative to the delayed signal (Vshift), characterized in that the measuring means (21) are arranged such that to determine the temporal position of the delayed signal (Vshift) relatively to the first horizontal sync signal (H1sync) of the first field and to the first horizontal sync signal (H2sync) of the second field, that the delay stage (23) is designed in such a way that the delay time (reg) is adjustable, and that computing means (24) are provided which, depending on the results of the measuring means (21) calculate a specific delay time (reg) in such a way that the time interval (X, Z) between the delayed signal (Vshift) and the directly leading horizontal sync signal (Hsync) of a first field and the directly lagging horizontal sync signal (Hsync) of a second field are essentially identical.

5. Circuit for conditioning sync signals according to claim 4, characterized in that the circuit comprises storage means (22), in which the results of the measuring means (21) can be stored.

6. Circuit for conditioning sync signals according to claim 5, characterized in that a control unit (23) is provided which, depending on which field is currently being written, outputs a corresponding control, signal to the storage means (22), which control signal serves for addressing storage locations in the storage means (22).

7. Television set, characterized in that it is equipped with a circuit for conditioning sync signals according to claim 4.

8. Television set, characterized in that it is equipped with a circuit for conditioning sync signals according to claim 5.

9. Television set, characterized in that it is equipped with a circuit for conditioning sync signals according to claim 6.

* * * * *